United States Patent [19]
Beim

[11] Patent Number: 5,868,644
[45] Date of Patent: Feb. 9, 1999

[54] MULTIPLE SPEED POWERSHIFT TRANSMISSION PROVIDING SYNCHRONOUS SPEED RATIO CHANGES

[75] Inventor: Rudolf Beim, Bloomfield, Mich.

[73] Assignee: Ford Global Technologies, Inc., Dearborn, Mich.

[21] Appl. No.: 992,278

[22] Filed: Dec. 17, 1997

[51] Int. Cl.⁶ .................................................... F16H 3/62
[52] U.S. Cl. ......................... 475/271; 475/269; 475/296
[58] Field of Search ................................. 475/269, 271, 475/275, 276, 277, 278, 279, 296, 298; 188/77 R, 77 W

[56] References Cited

U.S. PATENT DOCUMENTS

| | | |
|---|---|---|
| 787,908 | 4/1905 | Ford . |
| 1,005,186 | 10/1911 | Ford . |
| 1,009,954 | 11/1911 | Briones ................................. 475/276 |
| 1,073,569 | 9/1913 | Ford . |

*Primary Examiner*—Charles A. Marmor
*Assistant Examiner*—Sherry Lynn Estremsky
*Attorney, Agent, or Firm*—Frank G. McKenzie

[57] ABSTRACT

A multiple-speed epicyclic transmission produces speed ratios in response to movement of a brake band among components of the gearset and subsequent engagement with the gearset component that corresponds to the desired gear ratio. The brake band is biased into engagement with a corresponding gearset component by a spring and is released from that engagement using a hydraulic or electric actuator. A cartridge moves the band to the gearset component that must be held fixed against rotation to produce the desired gear ratio. Engagement of the brake band with a brake drum or ring gear holds the corresponding gearset component against rotation on the transmission housing.

4 Claims, 3 Drawing Sheets

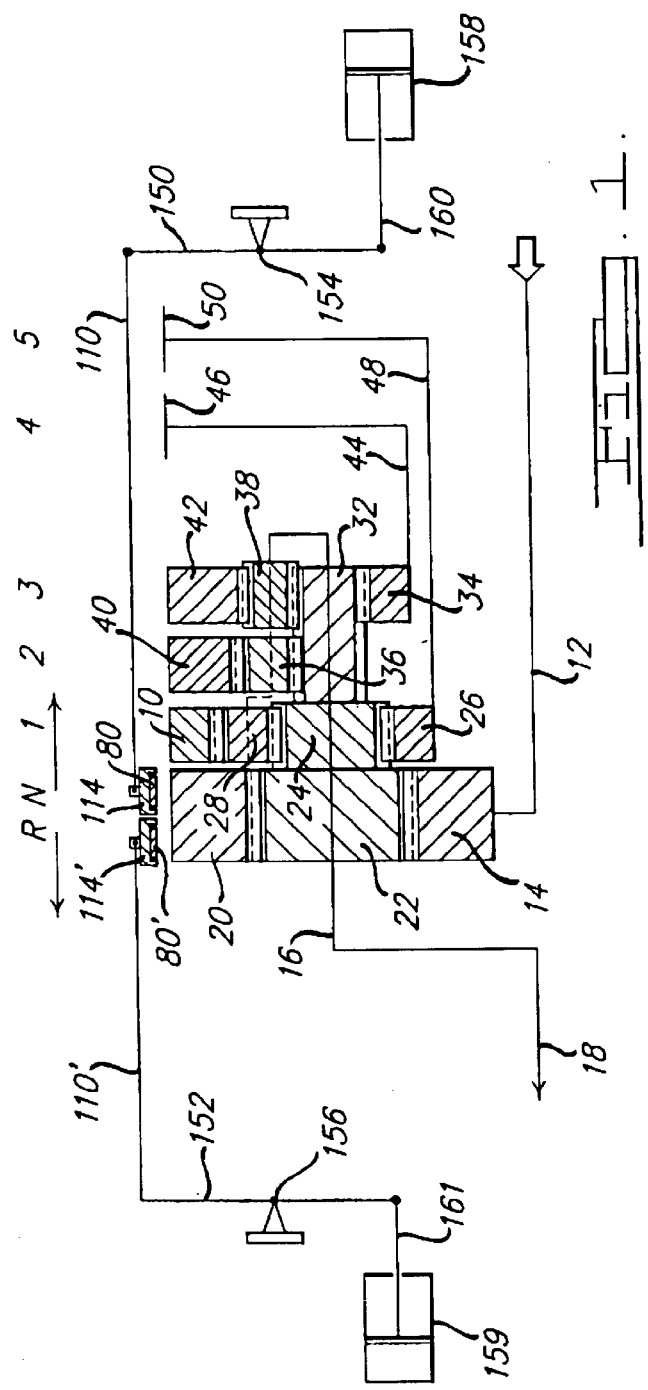
FIG. 1.
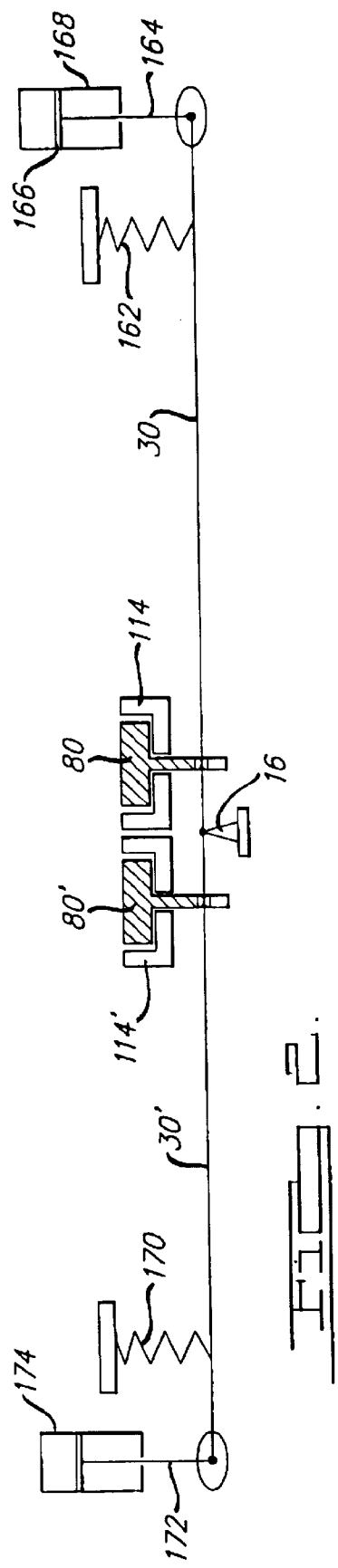
FIG. 2.
FIG. 3.

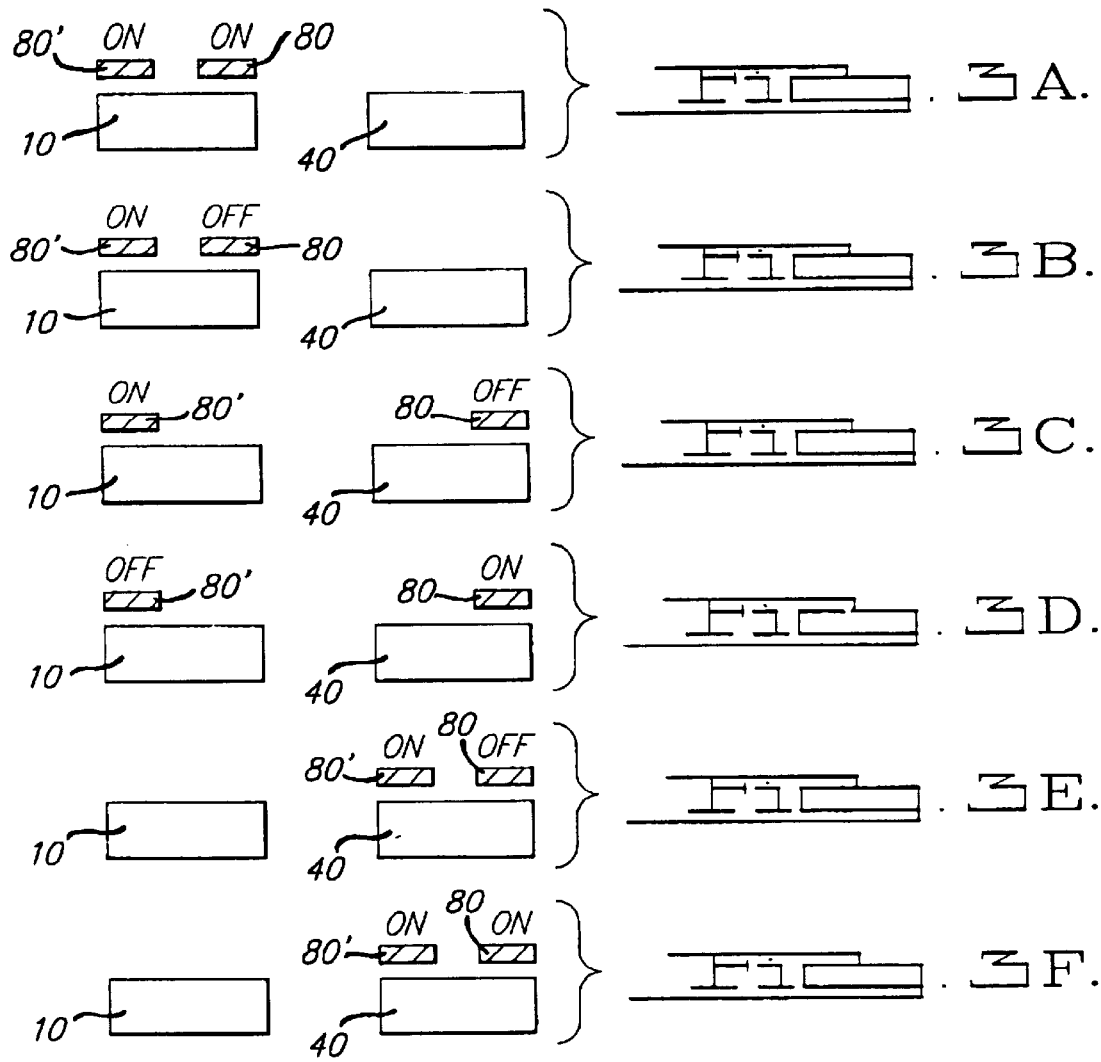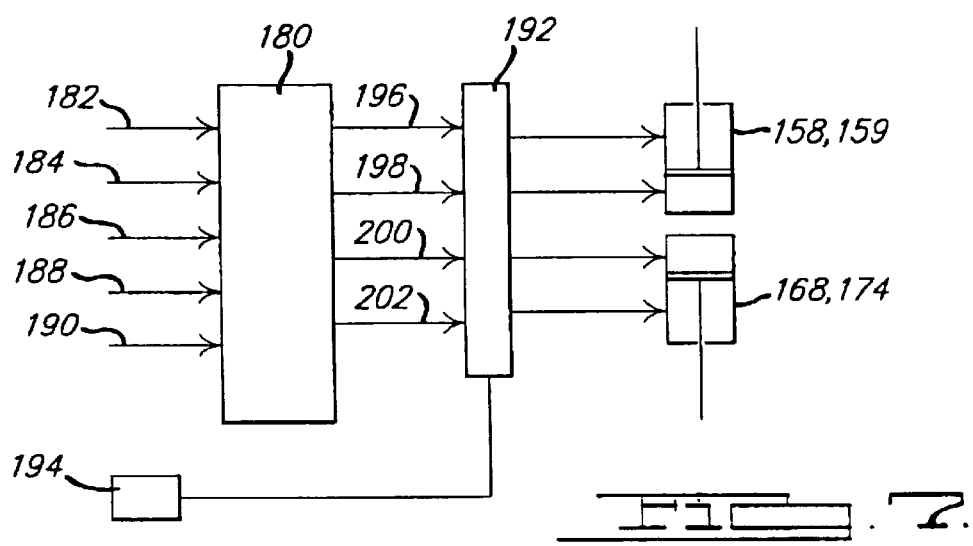

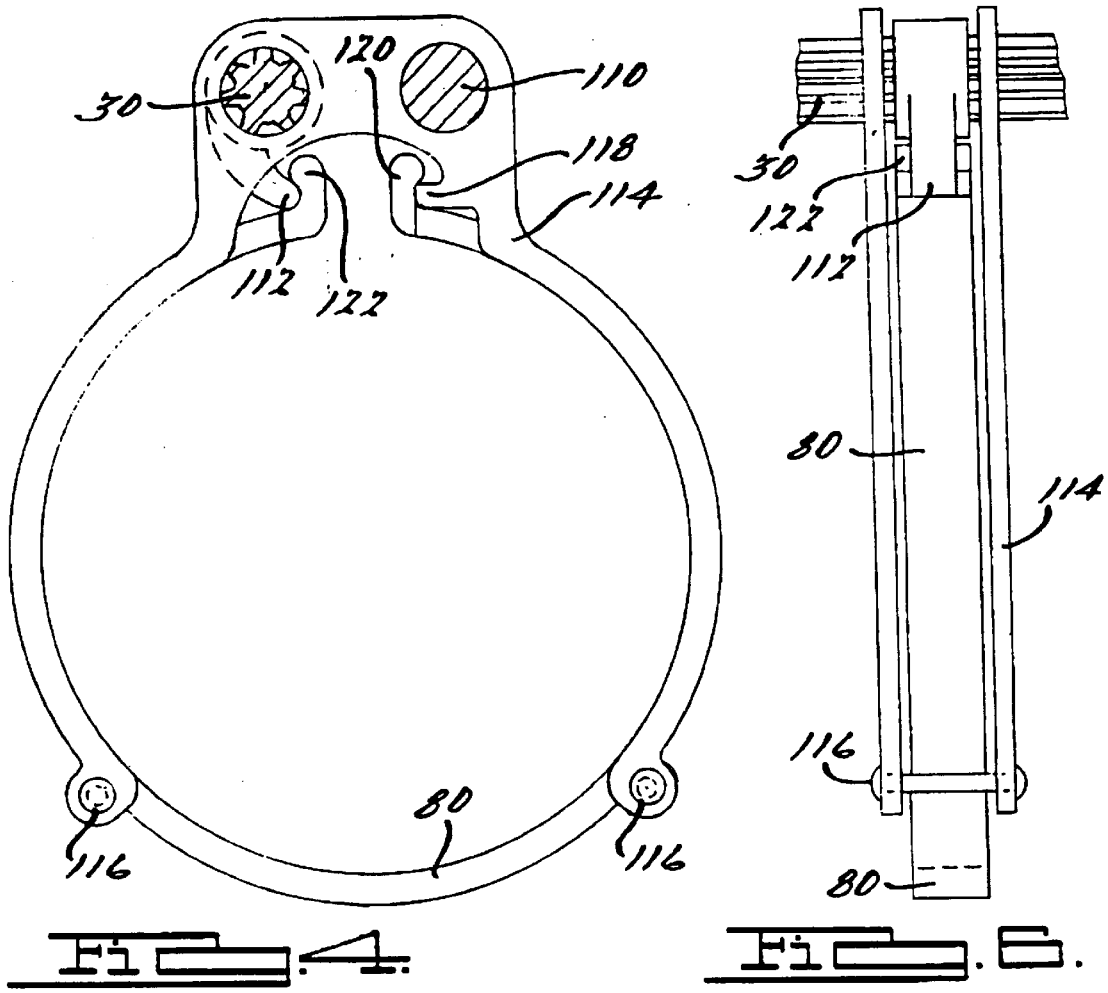
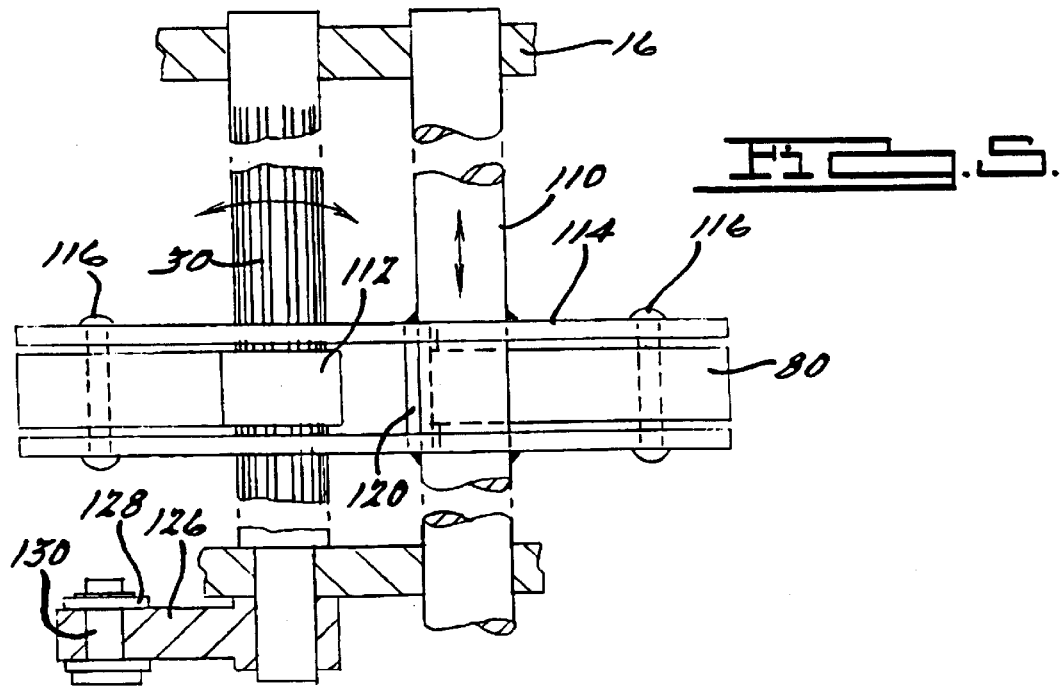

MULTIPLE SPEED POWERSHIFT TRANSMISSION PROVIDING SYNCHRONOUS SPEED RATIO CHANGES

BACKGROUND OF THE INVENTION

1. Field of the Invention

This invention relates to the field of automotive transmissions in which speed ratio changes are produced automatically. It pertains particularly to the kinematic arrangement and its actuation system for controlling such transmissions.

2. Description of the Prior Art

Conventional automatic transmissions for automotive use employ planetary gearsets, certain components of which are continually mutually interconnected, components that are selectively connected to other components through operation of clutches, and components that are selectively held against rotation by brakes. The selective, alternate application and release of the clutches and brakes produce the desired forward and reverse speed ratios. Gearing for such transmissions generally is epicyclic gearing, i.e., a system of gears in which one or more gears travel around the inside or outside of another gear whose axis is fixed. An epicyclic train is a combination of epicyclic gears, in which some or all the gears rotate about an axis and translate or revolve around that axis.

U.S. Pat. No. 787,908 describes a manual transmission producing a direct drive forward speed ratio and forward and reverse low speed ratios by alternately engaging two brake bands and a clamping disc, each associated with one of these speed ratios. The transmission includes a cluster pinion having three gears, each pinion meshing with a gear driven by an engine shaft.

U.S. Pat. No. 1,005,186 describes a transmission that produces low speed forward drive and reverse drive by selective engaging brake bands for holding sun gears against rotation. A cluster gear having three planet pinions meshes with an output sun gear, a forward drive sun gear and a reverse drive sun gear, respectively. A friction clutch driveably connects the transmission output and a drive shaft.

Each of these transmissions produces reverse drive and low speed forward drive by alternately depressing pedals that cause engagement of a corresponding brake band. Direct drive results when these pedals are released. The axial position of each brake band is fixed so that the band continually surrounds the corresponding brake drum; its position is not altered by any other action including manipulation of a gear selector lever by the vehicle operator.

SUMMARY OF THE INVENTION

It is an object of this invention to provide an epicyclic gearset transmission controlled by selectively holding components of the gearset associated with each speed ratio. Operation of the transmission is controlled automatically by moving a brake band among the gearset components and alternately holding the gearset components against rotation by causing the brake band to engage the component that corresponds to the desired speed ratio.

Advantages of the present invention include a low cost assembly requiring only one friction element engagement, i.e., one brake band to engage multiple gearest components. Need for a conventional dry clutch located between the engine shaft and transmission input shaft is eliminated. Furthermore, the transmission according to the present invention produces synchronized speed ratio changes without need for any synchronizers, which typically require dog clutches, sliding sleeves, machined clutch teeth, shift forks, and a complicated shift mechanism. Elimination of these components reduces the required space, cost and complexity of the assembly compared to those of conventional transmissions and improves durability and reliability.

A multiple speed transmission according to this invention includes an input shaft; an output shaft; a planetary gearset driveably connected to the input shaft and output shaft, having a first member held against rotation to produce reverse drive and released for rotation during forward operation, multiple second members alternately held against rotation to produce a forward speed corresponding to a second member and released for rotation during operation in a forward speed other than the speed corresponding to the respective second member; first and second portable brake bands, adapted alternately to engage and hold said first and second members against rotation and to disengage and release said first and second members for rotation; first actuators for moving the first and second brake bands independently to said first and second members for engagement therewith; means independently, selectively urging engagement of the first and second brake bands and the first and second members; and second actuators for independently, selectively disengaging the first and second brake bands from the first and second members.

BRIEF DESCRIPTION OF THE DRAWINGS

FIG. 1 is a schematic diagram showing the kinematic arrangement and actuation system for a transmission according to the invention.

FIG. 2 is a schematic diagram showing a device for engaging and releasing a brake band used in a transmission according to this invention.

FIGS. 3A–3F illustrate a sequence of brake band movement for power shifting transmission of FIG. 1.

FIG. 4 is an end view of a brake band and its cartridge assembly.

FIG. 5 is a top view of the assembly of FIG. 4.

FIG. 6 is a side view of the shift rails and assembly of FIGS. 4 and 5.

FIG. 7 is a schematic diagram of a control system for use in controlling a transmission according to this invention.

DESCRIPTION OF THE PREFERRED EMBODIMENT

Referring first to FIG. 1, an input shaft 12, driveably connected to a power source such as an internal combustion engine, is driveably connected to a sun gear 14 of a planetary or epicyclic gear unit. The carrier 16 of the gear unit is driveably connected to an output shaft 18, which drives the wheels of a motor vehicle.

The gear unit includes a ring gear 20 surrounding sun gear 18, and a first set of planet pinions 22 rotatably supported on carrier 16 in continuous meshing engagement with sun gear 14 and ring gear 20. Fixed to each of the pinions that comprise pinion set 22 is a planet pinion of the set 24, which is rotatably supported on carrier 16 in continuous meshing engagement with a second sun gear 26 and with each of the planet pinions that comprise a third set of pinions 28, also rotatably supported on carrier 16. Surrounding sun gear 26 and planet pinion sets 24, 28 is a second ring gear 30, which meshes with each pinion of the set 28.

Extending axially from, and fixed to each of the planet pinions that comprise pinion set 24 is a fourth set of planet pinions 32, rotatably supported on carrier 16 and in continuous meshing engagement with third sun gear 34. Each of the members of the planet pinion set 32 is in continuous meshing engagement with a member of fifth and sixth planet pinion sets 36, 38, respectively, which are also rotatably supported on carrier 16. Each member of planet pinion set 36 is in continuous meshing engagement with a third ring gear 40; each member of planet pinion set 38 is in continuous meshing engagement with a fourth ring gear 42.

Third sun gear 34 is driveably connected by a member 44 to a fourth speed brake drum 46, whose outer surface has substantially the same radius as that of the outer surfaces of ring gears 20, 30, 40, 42. Similarly, second sun gear 26 is driveably connected by a member 48 to a fifth speed brake drum 50, whose outer surface has substantially the same radius as that of the outer surfaces of the ring gears and brake drum 46. The outer surfaces of brake drums 46, 50 and ring gears 10, 20, 40, 42 are mutually adjacent, aligned and located in a substantially circular cylindrical surface.

First and second cartridges 114, 114' support first and second brake bands 80, 80' for axial displacement along the axis of rails 110, 110'. The friction brakes are actuated alternately to engage and release ring gears 10, 20, 40, 42 and brake drums 46, 50. When the ring gears and brake drums are engaged by the brake bands, they are held fixed against rotation because a rail that supports them is held fixed on the transmission casing against rotation. First gear results when ring gear 10 is held; second and third gears are produced when ring gears 40, 42, respectively, are held; fourth and fifth gears are produced when sun gears 34, 26, respectively, are held; and reverse gear results when ring gear 20 is held.

Referring now to FIGS. 4–6, a brake band and cartridge assembly are supported for axial displacement on a rail 110 having a circular cross section, and on a rail 30 having an exterior splined surface that engages complimentary splines formed on a finger 112 that engages with an end of brake band 80.

The cartridge 114 slides axially on rails 30, 110 in response to movement of the gear selector lever. When the vehicle operator depresses the clutch pedal, rail 30 rotates clockwise when viewed as shown in FIG. 4, bringing finger 112 out of engagement with the end of brake band 80 and releasing engagement of brake band with any of the brake drums 60, 68, 72. When the clutch pedal is released, rail 30 rotates counter-clockwise causing finger 112 to rotate and band 80 to contract around a brake drum and to engage the brake drum that corresponds to the gear ratio selected by movement of the selector lever.

Cartridge 114, which supports brake band 80, includes legs that depend radially and are held together by rivets 116. Cartridge 114 provides finger 118 fixed in position and permanently engaging the end 120 of band 80 that is opposite the end 122, which is engaged by the rotating finger 112.

Rail 110 is welded to the cartridge so that they move axially as a unit in response to movement of the gear selector lever.

As FIG. 5 shows, rail 30 is connected to a lever arm 126, which is pivoted about the axis of the rail as a rod 128, connected to lever arm 126 by a pin 130, moves vertically in response to movement of the shift selector lever.

Levers 150, 152 pivot about corresponding fulcrums 154, 156, to move brake band cartridges 114, 114' to the position of the ring gear or brake drum that corresponds to the position of the desired gear. Levers 150, 152 preferably are actuated hydraulically or electrically. FIG. 1 shows hydraulic servos 158, 159 supplied from a source of hydraulic pressure, which may be opened and closed to the corresponding servos through operation of a computer control system that executes a control algorithim to produce the desired gear ratio.

FIG. 2 shows schematically a system for engaging brake bands 80, 80' with the ring gear or brake drum corresponding to the selected gear or speed ratio. The description that follows applies to the portion of the brake band actuation system located on the right-hand side of the center support 16, and as illustrated in detail in FIGS. 4–6. The force developed by compression spring 162 causes rod 30 to rotate about its central axis, in the manner described with reference to FIG. 5, thereby causing brake band 80 to engage a ring gear or brake drum. However, the force of spring 62 is overcome by a force developed by actuator 168, which causes rod 30 to rotate about its axis in the opposite direction to that caused by spring 162. When the force of spring 162 is overcome by actuator 168, brake band 80 disengages from the ring gears and brake drums, and cartridge 114 is free to move axially to another position.

Actuator 168 may include a double acting hydraulic piston 166, moveable within a cylinder to which hydraulic pressure is applied in accordance with control of a microprocessor that executes control algorithims to produce coordinated axial movement of cartridge 114 and engagement and release of the ring gears and brake drums.

In a similar manner the angular position of rod 30' is determined by the force of a compression spring 170 and oppositely directed force produced by a actuator 172, applied and released automatically by a computer-based control system. Control algorithms are executed to produce control signals that pressurize and vent chambers within hydraulic servo 174.

The power shift sequence is described next with reference to FIG. 3A–3F. FIGS. 3A and 3B represent the status of brake bands before the commanded gearshift. An upshift from the first to second speed ratio begins with brake bands 80, 80' engaged with the outer surface of ring gear 10, thereby holding ring gear 10 fixed against rotation on the transmission casing 16. At this time, ring gear 40 is unrestrained and free to rotate because there is no engagement by either brake band. When an upshift is commanded, actuator 168 is energized, rail 30 rotates and overcomes the force of spring 162, thereby releasing engagement of brake band 80 on ring gear 10. Next, actuator 158 causes axial displacement of piston 160 and ring 110, thereby carrying brake band 80 rightward to the position of FIG. 3C, at the right-hand side of the outer surface of ring gear 40.

The torque reaction is next removed from ring gear 10 by pressurizing actuator 174, moving piston 172, and rotating rail 30', thereby overcoming the force of spring 70 and disengaging brake band 80' from ring gear 10 deenergizing actuator 168 allowing the force developed by spring 162 to cause engagement of brake band 80 on the outer surface of ring gear 40. This action completes the power shifting phase of the gear ratio change sequence illustrated by FIGS. 3C and D. Thereafter, as indicated in FIG. 3E, brake band 80' is moved rightward axially to the left-hand side of the outer surface of ring gear 40 through operation of actuator 159 and piston 161. Finally, the shift sequence is completed, as shown in FIG. 3F, by venting actuator 174 and allowing the force produced by spring 170 to cause engagement of brake band 80' on the outer surface of ring gear 40.

With the brake bands in the position shown in FIG. 3F, an upshift to the third speed ratio would be produced in a similar way as described for the 1–2 upshift by first disengaging brake band 80 from the outer surface of ring gear 40, moving that brake band rightward to the right-hand side of the outer surface of ring gear 42, and frictionally engaging brake band 80 on the outer surface of ring gear 42. Alternatively, a downshift to the first speed ratio from the second speed ratio condition shown in FIG. 3F would occur by first disengaging brake band 80' from its contact on the outer surface of ring gear 40, moving brake band 80' to the left-hand side of the outer surface of ring gear 10 and holding ring gear 10 against rotation due to its engagement by brake band 80.

An electronic control system for use with the present invention includes a integrated microprocessor 18 accessible to read only memory, in which computer algorithms for controlling the operation of the transmission are permanently stored, input signal conditioning circuits for converting analogue output of various sensors to digital form for processing by the CPU, and solenoid driver circuits for converting digital output of the CPU to analog electric voltage or current supplied to the windings of solenoids that control operation of the various servos 158, 159, 168, 174.

Sensors that produce input information to the microprocessor include output 182 from an engine speed sensor, an engine manifold pressure sensor signal 184, which produces a signal representative of the pressure in the engine intake manifold downstream of a throttle valve, a throttle position sensor signal 186, which represents the degree to which the engine throttle is open or the accelerator pedal is depressed by the vehicle operation in relation to a reference position, a vehicle speed sensor signal 188, a PRNDL sensor signal 190, which represents the position of the gear selector lever in the various ranges of speed ratios that can be produced by the transmission.

A valve body 192, supplied with hydraulic fluid from a source of regulated hydraulic pressure 194, includes solenoids that direct hydraulic pressure to the servos that control the axial position of cartridges 114, 114' and the servos that control the engaged and released status of brake bands 80, 80' in response to the electrical signals 196, 198, 200, 202 applied to the solenoids in the valve body 194.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

I claim:

1. A multiple gear ratio automotive transmission, comprising:
   an input shaft;
   an output shaft;
   a planetary gearset driveably connected to the input shaft and output shaft, having a first member held against rotation to produce reverse drive and released for rotation during forward operation, multiple second members alternately held against rotation to produce a forward speed corresponding to a respective second member and released for rotation during operation in a forward speed other than the speed corresponding to the respective second member;
   first and second portable brake bands, adapted alternately to engage and hold said first and second members against rotation and to disengage and release said first and second members for rotation;
   first actuators for moving the first and second brake bands independently to said first and second members for engagement therewith;
   spring means independently, selectively urging engagement of the first and second brake bands and the first and second members; and
   second actuators for independently, selectively disengaging the first and second brake bands from the first and second members.

2. The transmission of claim 1, wherein the first member further includes a first surface, each second member further includes a second surface located adjacent the first surface or another second surface, the first and second surfaces being aligned radially and axially.

3. The transmission of claim 1, further comprising;
   a first cartridge supporting the first brake band and moveable alternately to said first and second gearset members, for transporting the first brake band to said first and second gearset members for engagement therewith, the cartridge moveable in response to movement of one of the first actuators; and
   a first spring urging the first brake band into engagement with a first or second member;
   a second cartridge supporting the second brake band and moveable alternately to said first and second gearset members, for transporting the second brake band to said first and second gearset members for engagement therewith, the cartridge moveable in response to movement of another of the first actuators; and
   a second spring urging the second brake band into engagement with a first or second member;
   manual movement of the clutch pedal to the disengaged position causing the brake band to disengage said gearset members thereby releasing said gearset members for rotation.

4. The transmission of claim 3, further comprising:
   a first rail fixed against rotation and fixed to the first cartridge, supporting the first cartridge for movement to said first and second members in response to movement of the one of the first actuators; and
   a second rail supporting the first cartridge, adapted, in response to movement of one of the second actuator and the spring means, alternately to engage mutually the first brake band with a first or second member, thereby holding said member against rotation, and to disengage the first brake band and said member, thereby releasing said brake member for rotation,
   a third rail fixed against rotation and fixed to the second cartridge, supporting the second cartridge for movement to said first and second members in response to movement of the another of the first actuators; and
   a fourth rail supporting the second cartridge, adapted, in response to movement of another of the second actuators and the spring means, alternately to engage mutually the second brake band with a first or second member, thereby holding said member against rotation, and to disengage the second brake band and said member, thereby releasing said brake member for rotation.

* * * * *